Feb. 21, 1967          H. M. PIKER          3,304,603
METHOD OF MAKING AN INSULATED PICNIC JUG OR CONTAINER
Original Filed Jan. 22, 1963          3 Sheets-Sheet 1
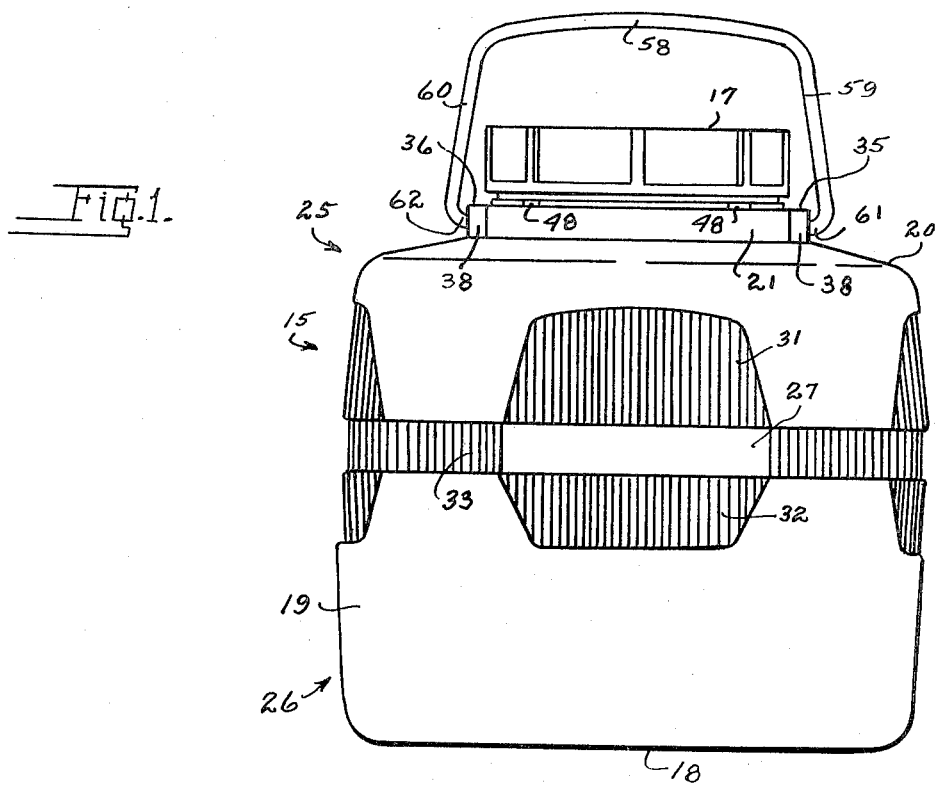
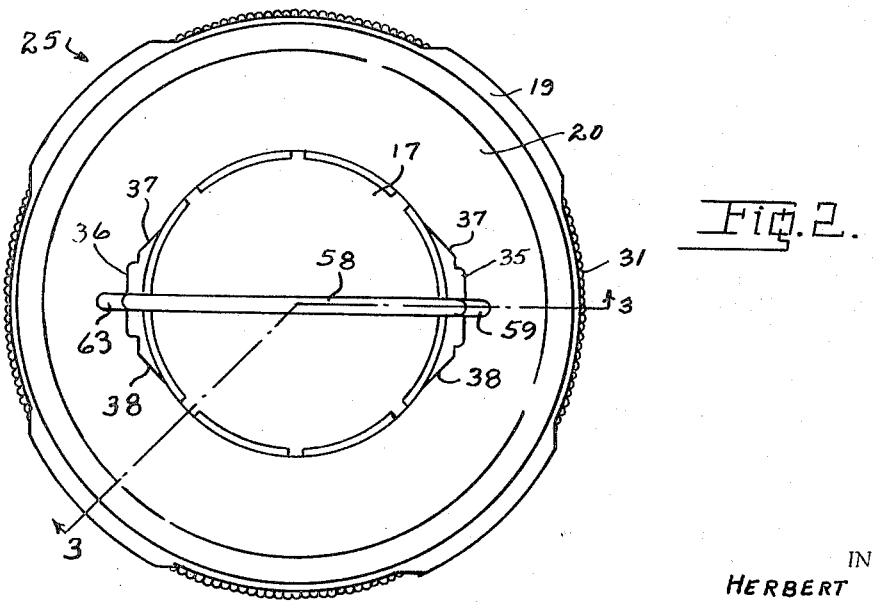
INVENTOR.
HERBERT M. PIKER
BY
Joseph A. Rave
Attorney

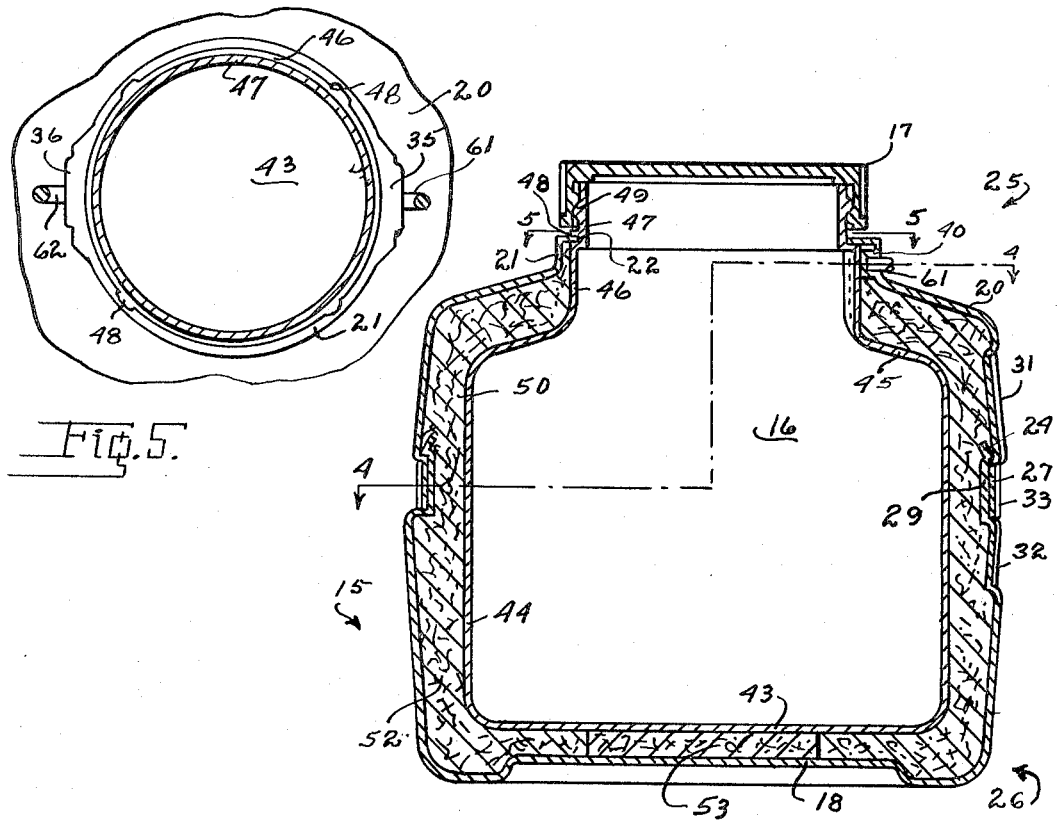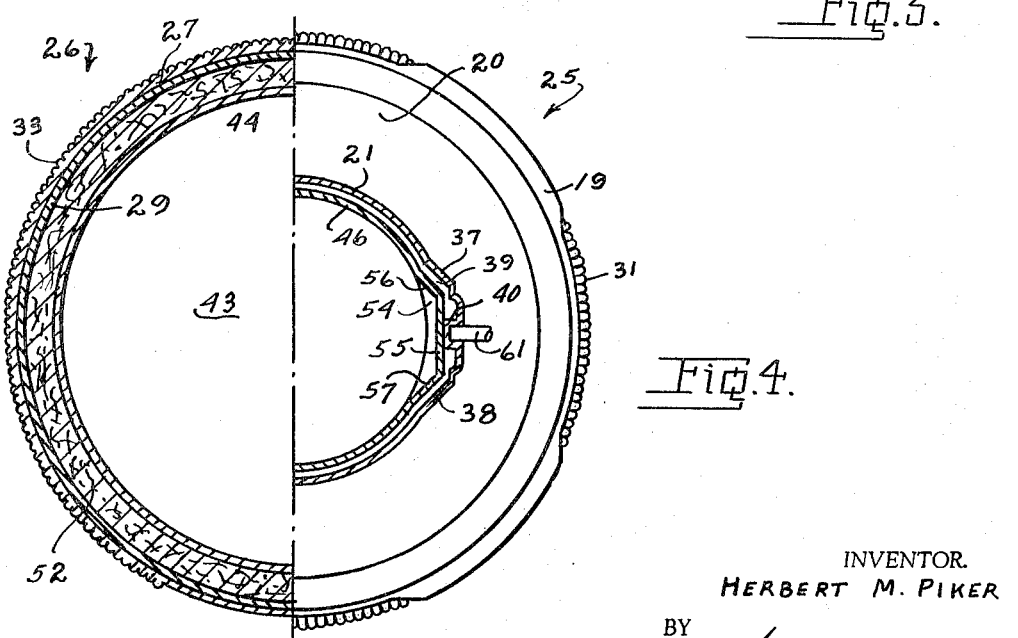

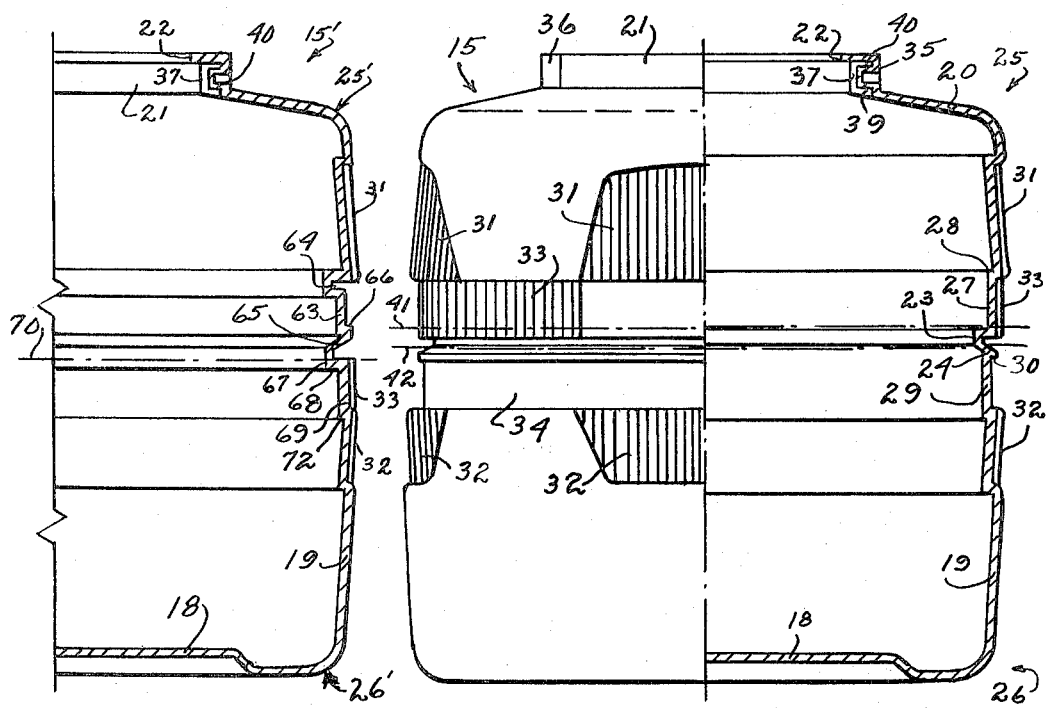
Fig. 9.   Fig. 6.
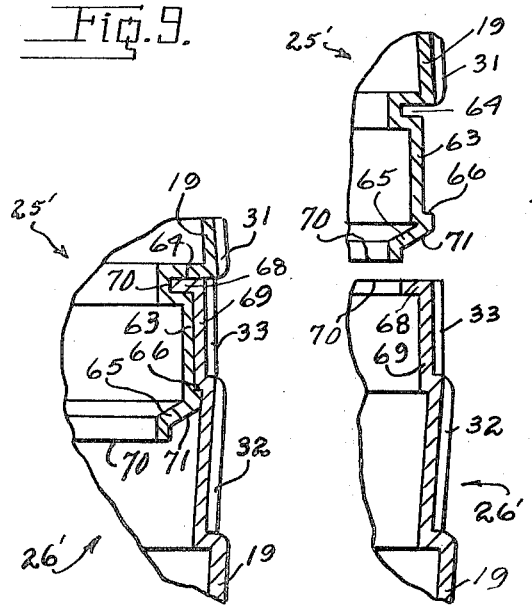
Fig. 11.   Fig. 10.   Fig. 8.
INVENTOR.
HERBERT M. PIKER
BY
Joseph A. Rave
Attorney
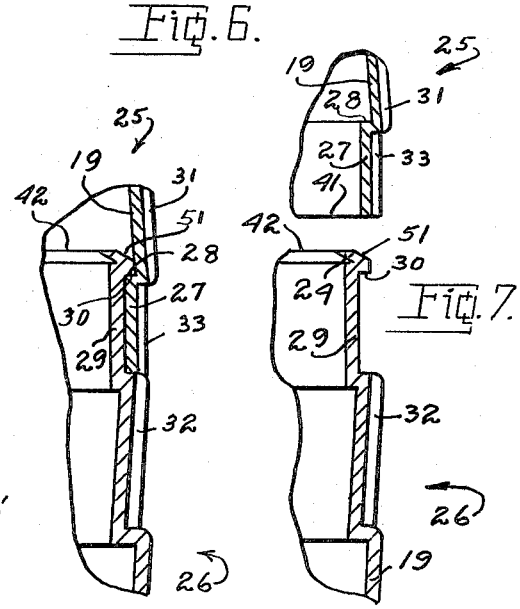

United States Patent Office 3,304,603
Patented Feb. 21, 1967

3,304,603
METHOD OF MAKING AN INSULATED PICNIC JUG OR CONTAINER
Herbert M. Piker, Wyoming, Ohio, assignor to The Hamilton-Skotch Corporation, Hamilton, Ohio, a corporation of Ohio
Original application Jan. 22, 1963, Ser. No. 253,191. Divided and this application May 27, 1964, Ser. No. 370,598
3 Claims. (Cl. 29—416)

This is a divisional application on the Herbert M. Piker pending application for Insulated Picnic Jug or Container, Serial No. 253,191 filed January 22, 1963.

This invention relates to improvements in a method of making an insulated picnic jug or container, particularly to such a jug or container wherein use is made of spaced apart inner and outer members suitably insulated from one another.

Insulated picnic jugs or containers are relatively well-known but due to improvements in materials and cost it is necessary to find improved constructions and methods of manufacture and production. By the present invention there is provided an improved construction and method of producing an insulated picnic jug or container wherefore the said picnic jug or container may be produced at materially reduced cost and said costs passed on to purchasers of the device.

The principal object of the present invention is the provision of an insulated picnic jug or container that may have the inner and outer members thereof produced in several separate parts or sections and manually assembled with a minimum of further manufacturing cost.

Another object of the present invention is the provision of a method producing an insulated jug or container wherein the outer member is produced in two parts which are readily assembled with one another after the association therewith of an inner member or container.

A further object of the present invention is the provision of a method producing an insulated jug or container in which the inner and outer members are each formed of a synthetic resin, plastic, using the blow method and said members subsequently assembled as a unitary structure with the inner member suspended within the outer member.

A still further and specific object of the present invention is the provision of an improved method of forming, processing and assembling inner and outer members of an insulated container.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a front elevational view of an insulated picnic jug or container including the structure and produced in accordance with the method of the present invention.

FIG. 2 is a top plan view of the insulated picnic jug or container of FIG. 1.

FIG. 3 is a vertical sectional view through the jug or container of the present invention as seen from line 3—3 on FIG. 2.

FIG. 4 is a staggered horizontal or transverse sectional view through the jug or container as seen from line 4—4 on FIG. 3.

FIG. 5 is a transverse sectional view through the neck of the jug or container of FIG. 3 as seen from line 5—5 on said FIG. 3.

FIG. 6 is a view partly in section and partly in elevation of the jug or container outer member as produced and prior to machining and assembly.

FIG. 7 is an enlarged, fragmentary, sectional view of a portion of the outer container structure of FIG. 6 after the same has been machined or processed.

FIG. 8 is a sectional view of the parts of FIG. 7 in operative assembled relation to one another.

FIG. 9 is a sectional view of a half outer member of the jug or container, similar to the sectioned portion of FIG. 6, showing a modification of the structure within the purview of the present invention.

FIG. 10 is a view similar to FIG. 7 showing, on an enlarged scale, a portion of the structure of FIG. 9 after the same has been machined or processed.

FIG. 11 is a view similar to FIG. 8 showing the parts of FIG. 10 in assembled and operative positions.

Throughout the several views of the drawings similar reference characters are employed to denote the same or similar parts.

In general, and with particular reference to FIG. 3, the insulated picnic jug or container of the present invention comprises an outer member, preferably formed of synthetic resin, plastic, and indicated in its entirety by the reference numeral 15, an inner member or container, again preferably formed of synthetic resin, plastic, and indicated in its entirety by the reference numeral 16 and with said inner container closed by a cap 17.

The outer member 15 is preferably made by the blow method and comprises, as seen in FIG. 6, a bottom or base 18 from the periphery of which upstands the wall 19 terminating at its upper end in an inwardly, upwardly, slanted top 20 having upstanding therefrom, substantially centrally thereof, a collar 21 provided centrally thereof with an opening 22. As shown in FIGS. 2 and 4 the outer member 15 is circular in plan but the same may be made to simulate a square or any other construction as desire and utility may dictate.

In general, the wall 19 of the outer container is of relatively small and substantially uniform thickness upwardly of the bottom or base 18 having substantially midway of the height of the said wall a reduced diameter portion consisting of a central sleevelike portion or band 23 with an outward, downward, inclined ledge portion 24. The said reduced diameter sleeve or band 23, upwardly and downwardly thereof, provides the outer member 15, in effect, with an upper part 25 and a lower part 26.

The upper part 25, upwardly of the central band 23, is provided with a slightly enlarged diameter band portion 27, and which is a diameter slightly less than the diameter of the wall 19 and since the thickness of said wall is substantially uniform throughout its height there is thereby provided at the upper end of said band 27 and interiorly of the outer member a shoulder 28.

Similarly the lower part 26 of the member 15, below the reduced diameter central band or sleeve portion 23 is likewise provided with a sleeve portion band 29 of a diameter that, again, is less than the external diameter of the wall 19. The said lower part 26 of the outer member 15 at the upper end of its band portion or sleeve 29 is provided with an outward radial shoulder 30 which is conveniently provided by and integral with the outwardly and downwardly inclined ledge 24 from the central reduced band or sleeve portion 23.

As illustrated in the drawings the said member 15 upper part sleeve 27 and the lower part sleeve 29 each extend parallel with the vertical axis of the outer member 15 while the portion of the wall 19 of the outer member upper part above the sleeve portion or band 27 upwardly and inwardly inclines to the top 20 and the similar portion of the wall 19 of the outer member lower part downwardly and inwardly inclines to the base or bottom 18. It will further be noted that the said inclined portions of the wall 19 are respectively provided with ribbed areas 31, for the container upper part, and ribbed areas 32, for the container lower part. It will further be noted that the container upper part sleeve or band portion 27 is ribbed as at 33 while the similar sleeve or band portion 29 of the container lower part is left plain, as at 34.

It should be noted that the external diameter or dimension of the outer member lower part sleeve or band portion 29 is substantially equal to, or a few thousandths of an inch less than, the internal diameter of the corresponding sleeve or band portion 27 of the outer member upper part 25, for a purpose presently to be made clear.

As illustrated in FIGS. 4 and 5 the outer member collar 21 is provided at diametrically opposite points with outwardly projecting lugs 35 and 36 which are connected with the container collar at its opposite ends by inclined walls 37 and 38 thereby providing said lugs 35 and 36, in effect, with hollow interiors as at 39. Each of the lugs 35 and 36 is further formed with an inwardly projecting socket 40 for the purpose of attaching a carrying handle, as will presently be made clear.

After the outer member 15 has been formed as above described and disclosed in FIG. 6 the same is separated into its upper and lower parts by means of saw cuts, as on the lines 41 and 42 on FIG. 6, said cuts may be effected by a single tool which removes the material between the lines 41 and 42. By this construction, and as seen in FIGS. 3 and 7, the upper part 25 of the outer member 15 terminates at the lower end of the sleeve or band 27, while the lower part 26 of the said outer member 15 has its upper edge at the upper end of the inclined ledge 24. The upper end of the ledge 24 is of such a diameter, or dimension, that it enters the sleeve or band 27 as will be presently made clear.

The inner member or container 16 similar to the outer member is, preferably, formed by the blow method, and is provided with a bottom 43 from the periphery of which, substantially normal thereto, upstands the wall 44 of relatively small thickness and with said well terminating in a top 45 inwardly, upwardly, inclined to a sleeve 46. Upwardly of the sleeve 46 the inner container has projecting therefrom a neck 47 of a diameter slightly less than the sleeve diameter 46.

The sleeve 46 has outwardly projecting therefrom, at spaced points therearound, lugs 48 for a purpose presently to be made clear. The neck 47 has formed on its exterior surface threads 49 co-operating with similarly formed threads of the closure cap 17 and whereby said closure cap is secured to the said inner container.

In practice the external diameter of the inner container sleeve 46 is substantially equal to, or slightly greater than, the internal diameter of the outer member opening 22 wherefore a close fit of these parts is effected upon assemblage, that is, upon the passing of said sleeve 46 through the opening 22, as will presently be made clear.

After the outer member 15 has been formed as illustrated in FIG. 6 and cut to provide the upper part 25 and lower part 26, as illustrated in FIG. 7, the inner container is assembled with the outer member upper part 25 and the lower part 26 of the outer member is then assembled with the outer member upper part. The assembling of the inner member or container 16 with the outer member upper part 25 consists in passing the inner member or container neck 47 through the outer member opening 22 and then forcing the sleeve 46 of said inner member or container through the outer member opening 22 until the lugs 48 from the sleeve 46 are disposed on the upper surface of the outer member collar 21, as illustrated in FIGS. 3 and 5. The said inner member or container 16 is now suspended substantially centrally of the outer member top part and since the inner container 16 has an external diameter and a height considerably less than the internal diameter and height of the outer member 15 a considerable space 50 is provided between the wall of the said outer member upper part 25 and the corresponding opposed wall of the inner member or container.

The lower part 26 of the outer member 15 is now assembled with the upper part 25 by inserting the sleeve portion or band 29 of the lower part 26 within the upper part lower sleeve 27. This assembling is facilitated by the upper surface of the ledge 24 which in effect acts as a cam face 51, see FIG. 7, for inwardly pushing the sleeve 29 so that the parts telescope with respect to one another. This telescoping of the parts continues until the shoulder 30 of the outer member lower part 26 snaps behind, or above, the shoulder 28 of the upper part 25. The parts are now locked in operative relation with one another without danger of separation while in use. The space 50 between the wall 44 of the inner member or container 16 and the wall of the outer member lower part 26, as well as the above noted space between the wall of the inner member or container and the outer member upper part are packed with suitable insulation 52 for insulating the interior of the container 16 against transfer of heat and cold to the atmosphere exteriorly of the outer member.

The insulation 52 in the space 50 may take the form of the usual sheet or blanket insulating material which would be wrapped around the inner container at the time it is being assembled with the outer member upper part 25 and before the connection of the outer member upper and lower parts 25 and 26. Preferably however, the insulation would take the form of a foam type which is well-known and consists essentially of mixing two liquids, such as toluene and di-isocyanate. In other words, after the inner member or container and outer member upper part have been associated with one another the two liquids, in proper quantities, are placed in the space 50 and then the outer member lower part operatively connected with the upper part.

The chemical reaction of the insulation, or foam, forming liquids commencing substantially immediately upon their association and continues until the said chemical reaction has effected all of the liquid and which means that the entire space 50 is taken up by the said foam. The foam hardens to a substance generally referred to as foam plastic and has a definite shape and rigidity. This action, therefore, results in the entire space between the outer member and the inner member or container having a solid wall of insulation and which permanently, further, locks the outer member lower part sleeve or band 29 in operative relation to the said outer member upper part sleeve or band 27 for thereby further insuring said parts against separation from one another.

In practice and before the outer member upper and lower parts are interconnected with one another a preformed disc or block 53 of said heat insulating material, foam plastic, for example, is placed between the spaced bottoms of the said inner member or container and outer member lower part.

In the forming of the inner member or container 16 the said inner member or container neck 46 is provided at diametrically opposite points with outwardly projecting lugs 54, one of which is illustrated in detail in FIG. 4. The said lugs 54 closely conform to the hollow interior 39 of the outer member lugs 35 and 36, wherefore each of the said lugs 54 comprises a base 55 having angularly disposed end walls 56 and 57.

Upon assembly of the inner member or container 16 with the outer member upper part 25 care is employed to line up the said inner container lugs 54 with the hollow interior of the outer member lugs 35 and 36, with the result that the said inner container lugs end walls 56 and 57 are opposed to the outer member lugs end walls 37 and 38, respectively. This construction effects a lock between the inner member or container 16 and the outer member 15 prohibiting any relative rotative movement between said members after assembly.

As intimated above a handle or carrying means is provided for the jug or container and which means conveniently takes the form of a wire bail handle. As shown, particularly in FIGS. 1 and 2, the bail handle includes a body or carrying portion 58 from the opposite ends of which depend arms 59 and 60 each having its free ends inturned as trunnions at 61 and 62. The inturned ends or trunnions 61 and 62 are respectively inserted in a socket 40 of the outer member lugs 35 and 36 whereby the handle may be positioned as in FIG. 1 for transporting purposes or may be laid onto the outer member top 20 for storage purposes, all as is well-known.

The foregoing description, particularly of the outer member, deals with a construction wherein the outer member upper part 25 is telescoped over the lower part 26 but it is believed obvious that the reverse construction can readily be devised, as clearly illustrated in modified construction in FIGS. 9, 10 and 11.

The modified construction consists of the said outer member including a substantially central sleevelike portion or band 63, which corresponds to the sleevelike portion or band 29 above. At the upper end of the said sleeve or band 63 there is provided an inwardly projecting notch 64 which takes the place of the shoulder 28 of the construction in FIG. 6. The sleeve or band 63 is provided at its lower end with an inwardly inclined ledge 65 which terminates at one end in a shoulder 66 exteriorly of the container and takes the place of the similar shoulder 30 in the construction of FIG. 6. The lower end of the inclined ledge 65 terminates in a sleeve or band 67 at the inner end of an inwardly projecting radial flange 68 at the upper end of a sleeve or band 69. In the modified construction in FIG. 9 the sleeve or band 69 takes the place of the sleeve or band 29 of FIG. 6.

In the modification in FIG. 9 the upper part 25′ and the lower part 26′ are otherwise constructed identically with that in FIG. 6, namely, the remaining portion of the outer member upper part wall 19 and the remaining portion of the lower part wall 19 may have their exterior surfaces as plain or with ribbed areas such as the ribbed areas 31 and 32 of the construction in FIG. 6. In the construction in FIG. 9 the sleeve portion or band 69 is illustrated as including the ribs 33 but, these sleeve portions or bands may have their exterior surfaces as plain or devoid of any ribs or any other ornamentation. After the outer member is formed as illustrated in FIG. 9 it is cut transversely along a line 70 substantially at the lower end of the inclined ledge 65 and on the upper surface of the radial flange 68 with a construction result as in FIG. 10. As shown in FIG. 10 the upper part 25′ terminates at the lower end of the inclined ledge 63 having, in effect, a depending flangelike sleeve at its lower end and with the outer member lower part 26′ having at its upper end an inwardly projecting radial flange 68.

The outer member upper part 25′ terminal sleeve 67 has an external diameter to readily enter the circular opening in the lower part 26′ radial flange 68 to engage the inclined outer face 71 of the tapered ledge 63 and which acts as a cam to separate the parts and permit the telescoping of the parts. The said parts are telescoped until the radial flange 68 reaches and is inserted into the notch, actually circular groove, 64 of the outer member upper part 25′. At this time the shoulder 66 is beneath the shoulder 72 formed at the bottom of the sleeve portion or band 69 interiorly of the member.

The final assembly of the parts is as illustrated in FIG. 11 and it is obvious that the said outer member upper and lower parts, 25′ and 26′, are securely interlocked with one another, it being understood that prior to this assembly of the upper and lower parts 25′ and 26′ the inner member or container was assembled with the member upper part 25′. It is also to be understood that insulation was disposed in the space between the inner member or container and outer member parts prior to the final assembly.

From the foregoing, it is believed now evident that there has been provided an insulated picnic jug or container that accomplishes the objects initially set forth.

What is claimed is:

1. The method of producing a container consisting of an inner container and an enclosing member comprising forming the inner container to include a bottom, a peripheral upstanding wall from said bottom, a top, and a centrally apertured neck upwardly from said top, forming an enclosing member in one piece of plastic to include a bottom, a peripheral upstanding wall, and a substantially centrally apertured top, said enclosing member having formed in its upstanding wall upwardly and downwardly of a line at a point intermediate its top and bottom sleevelike portions of dimensions adapted to be subsequently telescoped with one another, said enclosing member during the formation thereof having formed in said upstanding wall between the aforesaid line and one of said sleevelike portions a flange having an inclined outer surface, severing said enclosing member at the said line between the said sleevelike portions into an upper part and a lower part with one of said upper and lower parts having therewith said inclined outer surface flange, inserting the inner container neck through the enclosing member upper part top aperture to suspend said inner container centrally and downwardly of said enclosing member upper part, and telescoping said enclosing member upper part and lower part sleeves through the inclined surfaced flange for reconnecting the said upper and lower parts and for completely enclosing the said inner member.

2. The method of forming an enclosing member for a container consisting in forming the said enclosing member by a blow method to provide the same with an integral bottom, an upstanding peripheral wall, a top at the upper end of the peripheral wall, and an apertured neck upwardly from the top, said peripheral wall including upwardly and downwardly of a line at a point intermediate the enclosing member bottom and top complementary interlocking portions including a sleeve upwardly and downwardly of said line adapted to be subsequently telescoped with one another, said enclosing member during the formation thereof having formed in the said peripheral wall between one of the sleeves and the aforementioned line a band having an inclined outer surface, severing the enclosing member on the aforesaid line between the aforesaid complementary locking portions to provide an upper part and a lower part, and subsequently telescoping the upper part and lower part sleeves through the inclined outer surface of the band acting as a cam in telescoping the said sleeve portions of the said interlocking portions for reconnecting the enclosing member upper and lower portions of the container for forming a completely enclosing container.

3. The method of forming an enclosing member for a container consisting in forming the said enclosing member by a blow method to provide the same with an integral bottom, an upstanding peripheral wall, a top at the upper end of the peripheral wall, and an apertured neck upwardly from the top, said peripheral wall including upwardly and downwardly of a line at a point intermediate the enclosing member bottom and top complementary interlocking portions including a sleeve upwardly and downwardly of said line adapted to be subsequently telescoped with one another, said enclosing member during the formation thereof having formed in the said peripheral wall at the inner end of one of said sleeves outwardly projecting surfaces and forming in said peripheral wall at the outer end of the other sleeve a band having an inclined outer surface and a shoulder below the outer surface, severing the enclosing member on the aforesaid line between the aforesaid complementary locking portions to provide an upper part and a lower part, and subsequently telescoping the upper and lower part sleeves of the said interlocking portions for reconnecting the enclosing member upper and lower parts of the container for forming a completely enclosing container, said sleeves are telescoped with one another through the band outer inclined surface acting as a cam in the telescoping of said sleeves, and the telescoping of the containers upper and lower parts sleeves until the projecting surface of the one sleeve and band shoulder of the other sleeve interengage to act as hook parts for locking the telescoped sleeves against axial withdrawal from one another.

References Cited by the Examiner

UNITED STATES PATENTS

| | | | |
|---|---|---|---|
| 2,991,500 | 7/1961 | Hagen | 264—152 X |
| 3,004,285 | 10/1961 | Hagen | 264—163 X |
| 3,138,279 | 6/1964 | Meissner. | |
| 3,214,830 | 11/1965 | Piker | 29—416 |

CHARLIE T. MOON, *Primary Examiner.*